United States Patent [19]
Costantini et al.

[11] 3,966,107
[45] June 29, 1976

[54] TAPE CASSETTE

[75] Inventors: Joseph A. Costantini, East Longmeadow; Glen E. Flint, Springfield; Richard J. Lanier, Indian Orchard, all of Mass.

[73] Assignee: Standard Electric Time Corporation, Springfield, Mass.

[22] Filed: June 5, 1974

[21] Appl. No.: 476,426

[52] U.S. Cl. .................................. 226/59; 226/5; 226/76; 226/118; 226/196
[51] Int. Cl.² ........................................... G03B 1/24
[58] Field of Search .................. 226/5, 76, 91, 195, 226/196, 118, 59; 352/72, 78

[56] References Cited
UNITED STATES PATENTS

| | | | |
|---|---|---|---|
| 2,327,480 | 8/1943 | Whitehead | 226/195 UX |
| 2,348,355 | 5/1944 | Miller | 226/5 X |
| 2,696,092 | 12/1954 | Miller | 226/118 |
| 3,034,692 | 5/1962 | Rusch | 226/59 |
| 3,265,817 | 8/1966 | Gilman | 226/118 X |
| 3,514,194 | 5/1970 | Ariyasu | 352/72 |
| 3,529,890 | 9/1970 | Buon | 352/78 X |
| 3,543,983 | 12/1970 | Dale | 226/196 X |
| 3,563,435 | 2/1971 | Whitehead | 226/118 X |

*Primary Examiner*—Richard A. Schacher
*Attorney, Agent, or Firm*—Johnson, Dienner, Emrich & Wagner

[57] ABSTRACT

A tape cassette for compactly storing programmed tape in a random fashion having a leaf guide which is arranged to contact a rotatable program drum to insure separation of the tape from the drum as the program drum advances the programmed tape. Preferably, the cassette is provided with a tape control means which enables only one layer of tape to be fed to the tape reader mechanism and which also serves to maintain the fed tape under tension.

9 Claims, 8 Drawing Figures

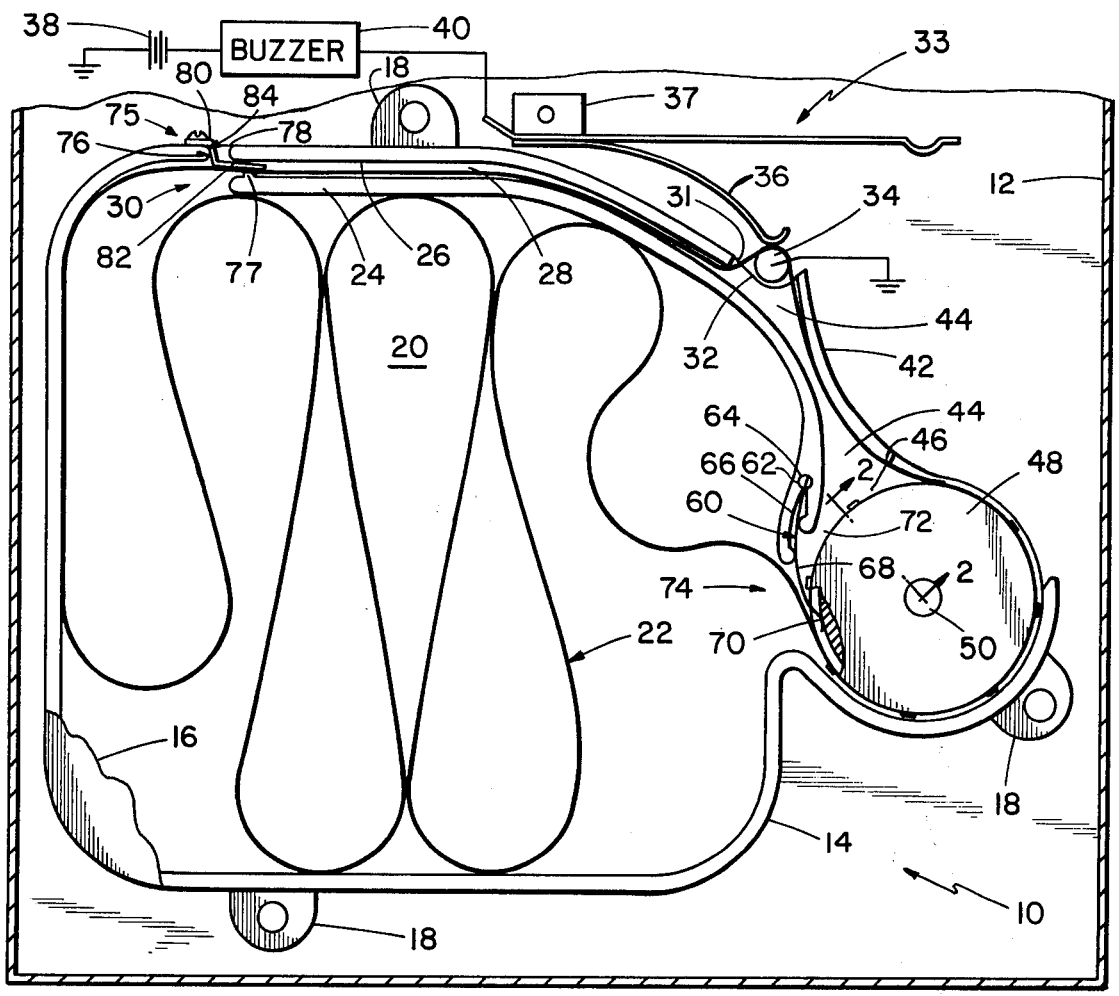
FIG.1
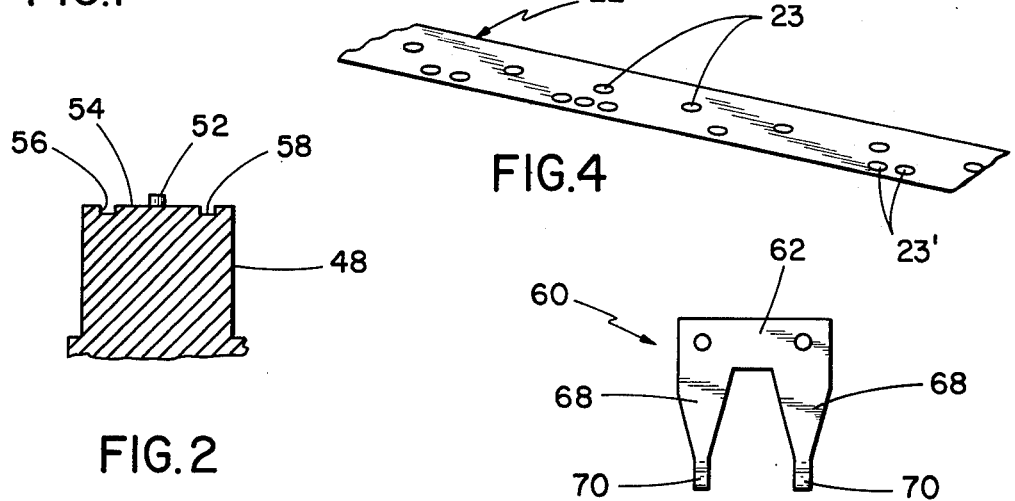
FIG.2
FIG.4
FIG.3

TAPE CASSETTE

BACKGROUND OF THE INVENTION

The present invention is related to a tape cassette having punched paper tape for providing output impulses according to the program of the punched holes on the paper tape.

In the field, programmed tapes are commonly used to control the operation of associated electrical or mechanical devices. In one specific embodiment, presently commercially available for use in the operation of time alarms at programmed intervals is a tape control system which includes an endless programmed tape and a program drum in the form of a sprocket having projections thereon which engage with perforations in the endless tape. As the sprocket is driven by associated clock equipment the programmed tape is advanced and the information provided on the tape is sensed by an associated readout mechanism. While such an arrangement is relatively simple in construction and use, one disadvantage is that the programmed tape tends to cling or adhere to the peripheral surface of the rotatable drum as well as to the drum projections. When this occurs, the programmed tape may ride the rotating drum past the normal point of departure and jamming or non-advancement of the tape will occur.

Such type of a tape control system also exhibits certain shortcomings when used with the lengthy tapes which accommodate larger amounts of programmed information, that is, whenever longer tapes are used it is necessary to provide numerous guide and tensioning rollers to insure reliable travel of the tape along an assigned path in the equipment. In addition, it is further necessary to provide a storage cabinet of considerable dimensions in order to house both the longer tape and the guide and tensioning rollers associated therewith. Cabinets for use in such a system typically have a dimension of about 1 foot 6 inches × 3 feet 0 inches. The guide and tensioning members, of course, represent additional cost and further introduce possible areas of malfunction such as tape drag. In addition, one or more of the rollers by reason of mishandling or wear may fall out of alignment with the rest of the rollers in the tape path. Either condition, that is, tape drag or roller misalignment may result in perforation tear on the tape with the consequent result that the tape may be laterally displaced from the assigned path of travel relative to the whole sensing readout mechanism. In such event, the system, of course, will fail to perform its intended function.

SUMMARY OF THE INVENTION

It is an object of the present invention to provide a tape cassette for a program tape control system, wherein jamming or non-advancement of the tape about the rotatable program drum is substantially eliminated.

It is another object of the invention to provide a tape cassette that is so constructed as to compactly store program tape in a random fashion.

It is another object of the present invention to provide a tape cassette which effects random storage while yet minimizing tape damage and/or misalignment of the program tape. It is another object of the present invention to provide a tape cassette which eliminates jamming problems by insuring that only one thickness or layer of tape is permitted to enter a passage leading to a tape reader mechanism.

It is another object of the present invention to provide a tape cassette wherein tension is maintained on the tape as it is being read.

It is another object of the present invention to provide a tape cassette housing which will enable partial removal of the tape for programming changes.

In order to accomplish the aforementioned objects of the present invention, there is provided a tape cassette housing for a program tape having a leaf guide that is arranged to contact a rotatable program drum so that as the drum advances the program tape, the leaf guide will act to peel the tape off the peripheral surface and projections of the drum. In the preferred embodiments, the drums are provided with a plurality of peripheral grooves dimensioned so as to have portions of the leaf guide slidably received therein, to thereby assure a proper peeling action by the leaf guide.

In further carrying out the aforenoted objects, the cassette itself is provided with a storage area that houses the tape program in a random fashion. The cassette is designed to be mounted adjacent a rotatable program drum in the tape control system which causes the tape to be advanced along a path which extends from an exit of the storage area in the cassette over a tape sensing position whereat a tape reader assembly is located which includes a program finger effective for sensing apertures in a program tape, around the rotatable drum and back into the entrance for the storage area.

To achieve yet another object of the present invention a tape control means is located adjacent an exit for the tape channel or passage within the housing. The tape control means includes a press member which is inherently resilient and is formed with a generally flat tape contact surface which, by virtue of its preformed resiliency, is urged downwardly toward a raised projection extending upwardly from a wall member in the housing. The tape normally travels between the projection and tape contact surface but by reason of the tape contact surface being urged downwardly, it serves to allow only one layer or thickness of tape to be passed therebetween. Additionally, the press member provides tension forces for the tape as it is advanced by the rotatable drum.

The tape carried by the cassette has both ends secured together to define an endless loop which is enabled to travel through the aforenoted continuous path to thereby provide continuous cycling of the program tape. Such arrangement eliminates the numerous guide and tension rollers used in prior art devices and further enables the provision of a compact tape cassette with extensive programming capabilities. A cassette housing made in accordance with the present invention measures, by way of example, 7½ × 6½ × 1⅛ inches, and replaces the conventional larger storage cabinets having guide and tension rollers, the dimensions of which have been aforedescribed.

These and other objects, features and advantages of the present invention will become apparent after a detailed description of the preferred embodiment when considered in conjunction with the accompanying drawings, wherein like reference numerals indicate like structure throughout the several views.

BRIEF DESCRIPTION OF THE DRAWINGS

FIG. 1 is a side elevational view of the tape cassette embodying the principles of the present invention with portions removed for clarity;

FIG. 2 is a view taken along section line 2—2 of FIG. 1;

FIG. 3 is a frontal view showing a preferred embodiment of the tape separator, made in accordance with the principles of the present invention;

FIG. 4 is a perspective view showing a fragmented portion of a program tape of the type adapted for use with the present invention;

DETAILED DESCRIPTION OF PREFERRED EMBODIMENTS

Figure 5:
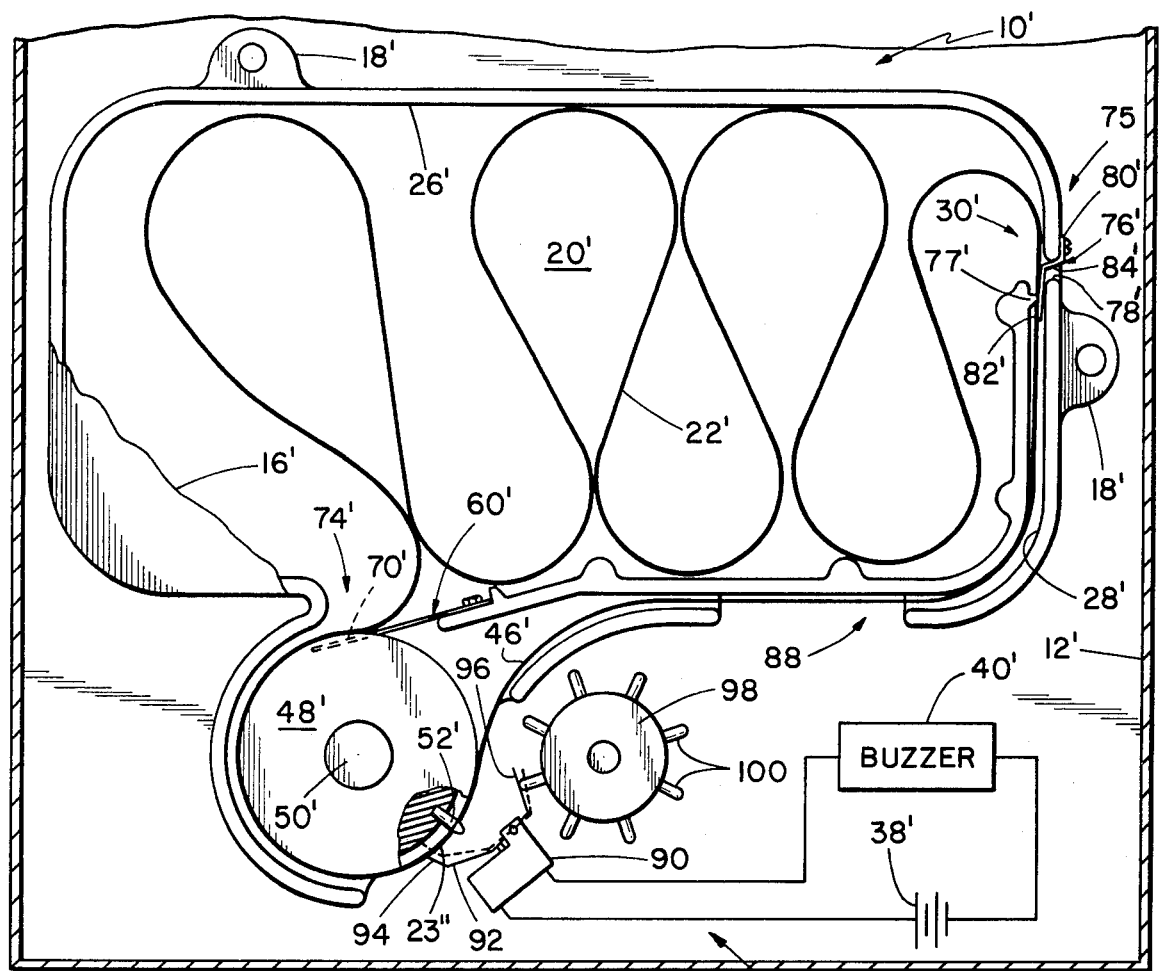
FIG. 5 is a side elevational view showing an alternate embodiment of a tape cassette embodying the principles of the present invention with a portion of the cover plate removed for clarity.
Figure 7:
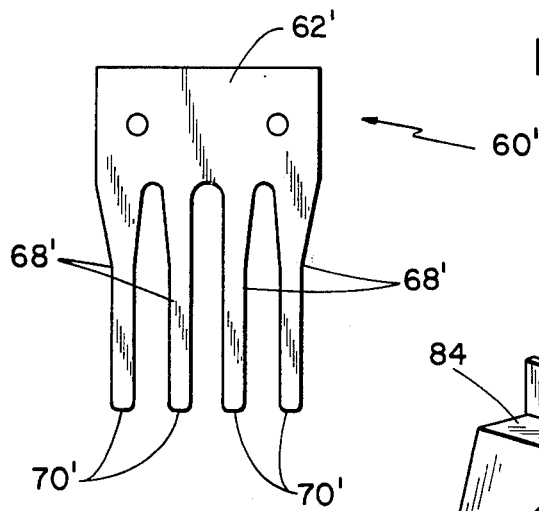
FIG. 7 is a plan view of an alternate embodiment of tape separator made in accordance with the principles of the present invention.
Figure 8:
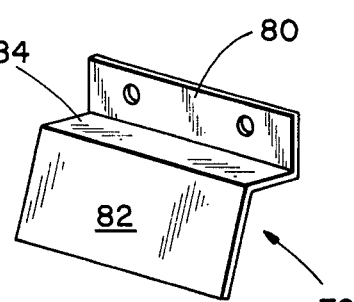
FIG. 8 is a perspective view of a press member which is included within the tape control means of the present invention.

Referring to FIGS. 1–3 of the drawing, there is disclosed a preferred embodiment of a tape cassette 10 which embodies the principles of the present invention. Cassette 10 is suitably secured to and within a cabinet 12 of a system which is to be controlled by the program on the cassette paper tape. In the particular embodiment being described, and so as to facilitate a better understanding of the present invention, the system to be controlled is represented as an alarm device which is energized at the predetermined times by the paper tape as advanced by a conventional master clock.

The cassette 10 includes a box-like housing 14 made of plastic material and a cover member 16. The cover member 16 is removably secured to housing 14 by means of conventional thumb screws (not shown) which threadedly cooperate with lugs 18 to affix the cover to the one side of the housing 14. When housing 14 and cover member 16 are joined together they define a magazine or storage compartment 20 for the storing of a program tape 22. The tape can be fabricated from any appropriate material and in the illustrated embodiment comprises a paper tape which has a first row of perforations 23 (FIG. 4) located along the center line of the tape for tape drive purposes and a second row of perforations 23' (FIG. 4) located adjacent the first row of perforations to provide control pulses in a programmed manner for use in the operation of associated equipment.

Interiorly disposed within the housing 14, and preferably integrally connected thereto, is a generally longitudinally and downwardly extending wall member 24. The wall member 24 is closely spaced to and with the topmost of the housing's interior side walls 26, so as to define a generally constricted tape guide passage 28 therebetween. The width of the wall member 24 is such that when cover member 16 is secured to the housing 14 there will be relatively little lateral shifting of the tape 22 as it is advanced, thereby assuring the proper positioning of the tape during its travel over the assigned path. An entrance end 30 for the tape guide passage 28 defines an exit for the storage compartment 20. One of the interior walls 26 locates an aperture 31 along the passage 28. Located intermediately in passage 28 is a tape sensing position whereat a recessed portion 32 accommodates one known type of tape reader assembly 33 including an electrically grounded electrical contact port 34, finger assembly 36, insulated means 37, and electrical power source 38. When the cassette 10 is properly mounted, the tape 22 exits from the housing 14 through aperture 31 and travels over the contact post 34 under a conventional finger assembly 36 and then moves back into the housing 14 as will be shown. The finger assembly 36 is connected to cabinet 12 by suitable insulated means 37 and rides on the surface of the tape 22 as it is pulled across contact post 34. A source 38 of electrical power and an electrical utility device 40 are connected to the finger assembly 36. The electrical utility device may comprise a unit or circuit such as an alarm circuit which is operative in response to the application of an electrical DC pulse such as generated by the circuit to be described.

Adjacent contact post 34 is a curved portion 42 of housing 14 which forms two flared mouths 44 for accommodating reentry of tape 22 back into the housing. One of the mouths 44 also defines an exit 46 for passage 28 which is adjacent a program drum 48 that is rotatably mounted within housing 14. Drum 48 is keyed to a central staff 50 of the master clock and is rotatably driven thereby. A series of equally spaced teeth or projections 52 (FIG. 2) extend outwardly from a peripheral surface 54 of the drum 48 to provide a drive sprocket for tape 22. As best shown in FIG. 2, a pair of grooves 56, 58 straddle projections 52, and extend below the peripheral surface 54. The purpose of grooves 56, 58 will be subsequently discussed. Also, as will become apparent from the subsequent discussion, any number of grooves can be provided.

As aforementioned, the present invention includes a relatively thin and deflectable separator member 60 in the form of a leaf guide which is used to effect separation of the tape from the drum in a consistently reliable manner. In the preferred embodiment, the leaf guide is made of phosphor bronze material and has a dimension of about 10/1000ths of an inch in thickness. One end 62 of the leaf guide is frictionally held within a hole 64 and slit 66 formed in the downwardly curved portion of the wall member 24. It is within the scope of the invention to secure this end of the leaf guide by any other type of suitably connection. As best shown in FIG. 3, leaf guide 60 has a pair of spaced legs 68 terminating in curved end surfaces 70. These end surfaces 70 are so dimensioned as to slidably fit into grooves 56, 58, respectively. The grooves 56, 58 insure constant positioning of legs 68 on the drum 48 so that the legs will be properly located to peel the tape 22 from the surface 54 and projections 52 as the drum 48 advances the tape in the direction of the separator member 60. The novel separator member 60 prevents tape 22 from accumulating within the area 72 which is located above the drum 48 and adjacent mouth 46. The possibility of jamming and non-advancement of the tape is thus minimized.

The leaf guide 60 is also positioned at an entrance 74 for the storage compartment 20 so that peeled tape 22 is deflected into such compartment. While grooves 56, 58 have been shown as a part of the drum, the leaf guide 60 would also have utility without them. Also, the leaf guide 60 could have any number of legs 68 which preferably would correspond to the number of grooves on drum 48.

Tape control means 75 is located adjacent entrance 30 to passage 28 and includes a tape separator or press member 76 mounted on housing 14 to extend through an opening 78 and to cooperate with a projection member 77 located within passage 28. Press member 76 is fabricated from a relatively thin resilient type material, such as .005 inch phosphor bronze and is defined by a retaining flange 80, a tape contacting surface 82, and a depending leg portion 84. Tape contacting surface 82 depends downwardly from leg portion 84 and by reason of its resiliency will normally press downwardly against the upwardly directed projection portion 77. Thusly, only one layer or thickness of tape 22 is permitted to pass therebetween from compartment 20 and enter into passage 28, thereby preventing jamming or clogging of the tape at that particular point in its path of travel. Press member 76 further serves to maintain tension on tape 22 as it is being advanced by the rotatable drum 48 and read by reader mechanism 33.

Prior to operation, tape 22 is fed within the housing 14 so that the centrally formed perforations 23 will engage projections 52. The ends of the tape 22 are spliced and cemented together to form an endless loop. A greater portion of the tape 22 is fitted in random fashion within storage compartment 20 and the tape is also placed within passage 28 with the top portion, adjacent aperture 31, being inserted between the contact post 34 and finger assembly 36.

In operation, as staff 50 is rotated by the master clock, drum 48 is advanced and the resultant rotational movement is transferred to tape 22 by projections 52 and drum surface 54 whereby the tape 22 advances along the generally circuitous path illustrated in FIG. 1. As the drum 48 rotates, a pulling force exerted by the teeth or projections 52 against the tape drive perforations 23 and drum surface 54 act to pull the tape 22 out of the storage compartment 20 into entrance 30 of the passage 28.

Tape press member 76, as mentioned, is biassed toward projection 77 thereby insuring that only one thickness or layer of tape 22 will enter passage 28. This cooperation avoids clogging or jamming of tape at entrance or exit 30. Additionally, the downward pressing force is sufficient to maintain the tape 22 in tension as the drum 48 is operated to advance it along its circuitous path, through passage 28, over a tape sensing position whereat it travels over contact post 34 and under finger assembly 36. Finger assembly 36 rides on the surface of tape 22, and as tape perforations 23' advance beneath the finger 36, the finger by reason of a preformed bias is urged into engagement with the grounded contact post 34 to complete an energizing circuit for the electrical utility device or buzzer 40. Such circuit extends from battery 38 over buzzer 40, finger 36 and contact post 34 to ground. With continued rotation of drum 48 the perforations 23' on tape 22 are advanced and the subsequent solid portion of the tape once more interrupts the electrical circuit to the electrical utility device 40. The tape is driven at a relatively slow rate and the electrical signal provided by the tape is normally used as an enabling signal for other clocks which achieve the desired operation independent of the duration of the signal imparted by the tape sensing finger assembly.

After passing over contact post 34, the tape 22 travels further through passage 28 until other of the central perforations 23 therein engage with projections 52. As the tape 22 moves around the drum 48 it is effectively separated from surface 54 and projections 52 by action of the legs 68 formed on the leaf guide 60. As aforementioned, the legs 68 effect a peeling off of the tape 22 from the drum 48 and feeds the separated tape 22 into entrance 74 of the storage compartment 20 wherein it will assume a random position in the manner illustrated in FIG. 1. The aforenoted preferred embodiment of the leaf guide 60 with legs 68 in grooves 56, 58 and its position adjacent entrance 74 insures that tape 22 will be fed into a storage compartment 20 in random fashion without jamming or non-advancement of tape.

An alternate embodiment of tape cassette 10 which is also made in accordance with the principles of the present invention is shown in FIG. 5. It should be understood, of course, that like elements in the two embodiments will be indicated by like reference numerals modified with the addition of prime markings to those numerals that are used in the second embodiment.

The tape cassette 10' shown in FIG. 5 differs from that shown in FIG. 1 in that it is redesigned to accommodate a different type tape reader mechanism 33'. Furthermore, the separator member 60' is modified to operatively cooperate with the modified rotatable drum 48' which is used in conjunction with the reader mechanism 33' and a tape access opening 88 is provided in casing 14'. As perhaps best illustrated in FIG. 5, it can be seen that opening 31 provided in casing 14 has been omitted whereby tape 22' will travel completely within cassette 10'.

In the present embodiment, a tape sensing position is located adjacent exit 46' of passage 28' whereat the tape reader mechanism 33' is situated and is of a presently known conventional type not forming part of this invention. The tape reader mechanism 33' includes a conventional program micro switch 90 which is suitably electrically connected to an electrical power source 38' and an electrical utility device 40'. Similar to the first embodiment, the electrical utility device 40' may comprise a unit or circuit such as an alarm circuit. Pivotally supported on and by micro switch 90 is a known type of program finger 92 having one end portion 94 adapted to ride over tape 22' and an opposite end portion 96 which is in intermittent contact with and in a known fashion cooperates with a rotating calendar drum 98. The calendar drum 98 is provided with radial projections 100 which whenever are in contact with end 96 prevent the program finger 92 from moving to the dotted line position (FIG. 5) and thereby prevent tape reading. However, whenever a projection 100 does not contact end portion 96, the end portion 94 upon detecting anyone of the punched holes 23'' is enabled to fall therethrough and contact rotatable program drum 48' as indicated by phantom lines in FIG. 5. Such action closes micro switch 90 thusly operating switch 90 to complete the electrical circuit for the electrical device 40'. Further, continued movement of tape 22' will force finger 92 upwardly until it again rides upon the surface of the tape and opens micro switch 90.

Figure 6:
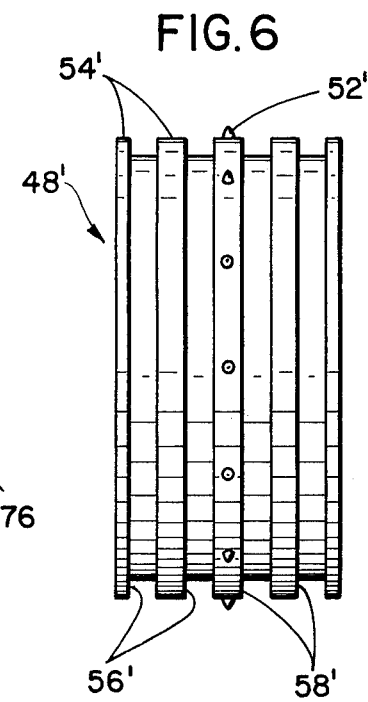
FIG. 6 is an end view of a rotatable program drum used in the embodiment shown in FIG. 5.

Rotatable drum 48' (FIG. 6) is similar to that of the previous embodiment except, however, it is preferably provided with two pairs of grooves 56' and 58', respectively. The additional grooves are used for tape reading purposes. Inasmuch as the rotatable drum 48' is provided with four grooves, separator member 60' is also modified so as to have four legs 68' with respective end surfaces 70'. The separator member 60' is detachably secured to interior walls 26' adjacent entrance 74' for storage compartment 20' by suitable means such as a pair of self-tapping screws or the like.

As mentioned, tape access opening 88 is formed in housing 14' to communicate with passage 28', whereby the opening 88 permits partial removal of program tape 22' thereby facilitating easy programming of the tape without requiring its removal should any programming changes become necessary. In the event it is desirable to remove tape 22', it is only necessary to simply pull the tape out at access opening 88. In order to pull the tape 22' back into the housing 14' it is only necessary to turn a thumb nut (not shown) on the sprocket staff 50'.

In the assembled condition, tape cassette 10' is structurally and functionally similar to cassette 10 of the first preferred embodiment, hence its operation should be apparent from the foregoing description.

The aforenoted constructional arrangements of the storage compartments 20, 20', tape separation or press members 76, 76', tape reader assemblies 33, 33', and program drums 48, 48', result in tape cassettes which are simple and economical to manufacture and which are more compact and convenient in use. Furthermore, the conventional shortcomings inherent in systems which use guide and tensioning rollers with their attendant drawbacks are eliminated.

What is claimed is:

1. In a tape cassette including a storage housing means for storing an endless perforated program tape in random fashion, a storage compartment, a rotatable drum compartment, said storage housing having a sidewall portion and an inner wall member defining a passage for said tape extending from said storage compartment to an opening in said cassette to permit movement of said tape over a sensing position adjacent a sensing means of associated equipment to said rotatable drum compartment, drive means including a rotatable drum means located within said rotatable drum compartment, said drum means having at least one peripheral groove and a plurality of projections which extend outwardly from a peripheral surface of said drum means to engage said perforations in said tape for advancing said tape by pulling said tape from said storage compartment through said passage, over said tape sensing position towards an entrance for said storage compartment, and separation means including a resilient leaf guide member located adjacent said entrance for said storage compartment having at least one leg portion with an end which slidably engages a surface of said groove of said rotatable drum means, whereby said separation means is effective to separate said tape from said rotatable drum means as said drum means advances said tape towards said entrance, and tape control means including a tension member extending towards said inner wall member at an entrance of said passage to contact said tape for permitting passage of only one layer of said tape into said passage thereby preventing clogging of said tape adjacent said passage and for maintaining tension on said tape as it is advanced towards said entrance of said storage compartment.

2. A cassette as set forth in claim 1 wherein said drum means has a plurality of peripheral grooves, and wherein said leaf guide member has a plurality of spaced-apart legs having respective end surfaces which slidably fit within respective ones of said plurality of grooves of said rotatable drum means.

3. A cassette as set forth in claim 1 wherein said tension member is of a resilient material, said inner wall member having a projection located adjacent said entrance of said passage, said resilient member being biassed toward and into engagement with said tape to operatively cooperate with said projection to control the movement of said tape.

4. A cassette as defined in claim 1 wherein an access aperture is provided for said cassette adjacent said passage so as to allow for partial removal of said tape for programming changes.

5. In a tape cassette, a storage housing for storing an endless apertured program tape in random fashion including a storage compartment, a rotatable drum compartment, a passage extending from said storage compartment to an opening in said cassette to permit movement of said tape over a sensing position adjacent the sensing means of associated equipment and reentry into a continuing portion of said passage to said rotatable drum compartment located at an exit for said passage, a rotatable drum located within said rotatable drive compartment said rotatable drum having a plurality of peripheral grooves and a plurality of projections which extend outwardly from a peripheral surface thereof to engage perforations on said tape for advancing said tape by pulling said tape from said passage and advancing said tape towards an entrance for said tape storage compartment, and a leaf guide secured to said cassette above said entrance and having a plurality of spaced legs with end surfaces, respective ones of said end surfaces slidably engaging respective ones of said grooves on said drum, whereby as said drum advances said tape towards said entrance, said legs are effective to separate said tape from said drum for redirection into said storage compartment.

6. A cassette as defined in claim 5 wherein said cassette includes a sidewall portion and a wall member disposed within said cassette generally parallel to said sidewall portion to define said passage for guiding said tape as it advances from said storage compartment to said rotatable drum compartment.

7. A cassette as defined in claim 6 which includes tape control means having a resilient member mounted on said cassette and a projection portion extending from said side wall at an entrance to said passage, and wherein said resilient member is biassed toward said projection portion and into engagement with said tape for preventing clogging of said tape adjacent said passage and for maintaining tension on said tape as it is advanced towards said exit for said passage.

8. A cassette as defined in claim 5, wherein said leaf guide is made of phosphor bronze having a thickness of approximately .010 inches.

9. In a tape cassette, a storage housing for storing an endless apertured program tape in random fashion, including a storage compartment, said cassette having an access opening which permits partial removal of said tape, a rotatable drum compartment, a passage extending from said storage compartment, past said access opening in said cassette to said rotatable drum compartment which is located at an exit for said passage and adjacent to a sensing position whereat the sensing means of associated equipment is located, a rotatable drum located within said rotatable drive compartment and including a plurality of peripheral grooves for advancing said tape by pulling said tape from said passage past said access opening and advancing said tape towards an entrance for said tape storage compartment, and a leaf guide secured to said cassette above said entrance and having a plurality of spaced legs with end surfaces, respective ones of said end surfaces slidably engaging respective ones of said grooves on said drum, whereby as said drum advances said tape towards said entrance, said legs are effective to separate said tape from said drum for redirection into said storage compartment.

* * * * *